United States Patent
Schmid et al.

[11] Patent Number: 5,722,611
[45] Date of Patent: Mar. 3, 1998

[54] BELT RETRACTOR

[75] Inventors: Johannes Schmid; Rolf Coras, both of Schwäbisch Gmünd, Germany

[73] Assignees: TRW Occupant Restraint Systems GmbH; TRW Inc.

[21] Appl. No.: 812,525

[22] Filed: Mar. 7, 1997

[30] Foreign Application Priority Data

Mar. 19, 1996 [DE] Germany ............... 296051152 U

[51] Int. Cl.⁶ ................ B60R 22/28; B60R 22/34; B65H 75/28
[52] U.S. Cl. ............... 242/376; 242/379.1; 242/587.1
[58] Field of Search ................ 242/376, 379.1, 242/587.1; 280/805, 806; 297/475–478

[56] References Cited

U.S. PATENT DOCUMENTS

| | | | |
|---|---|---|---|
| 3,291,416 | 12/1966 | Gionta | 242/587.1 |
| 3,802,641 | 4/1974 | Saito | 242/376 |
| 4,385,736 | 5/1983 | Yamamoto | 242/376 |
| 4,967,976 | 11/1990 | Kawai et al. | 242/376 |
| 5,529,259 | 6/1996 | Woydick et al. | 242/376 |
| 5,630,561 | 5/1997 | Ogawa et al. | 242/376 |

*Primary Examiner*—John M. Jillions
*Attorney, Agent, or Firm*—Tarolli, Sundheim, Covell, Tummino & Szabo

[57] ABSTRACT

According to the invention, a belt retractor comprises a frame and a belt reel provided with a longitudinal axis and a peripheral surface. The belt reel is rotatably mounted in the frame and is provided with an interior cavity which is coaxial with the longitudinal axis. The belt reel is further provided with a slot having a minimum width and extending in parallelism to the longitudinal axis. The slot is open towards the peripheral surface of the belt reel and towards the interior cavity. The belt reel further comprises a rod extending coaxially through the interior cavity with a radial play. The belt retractor further comprises a belt webbing connected to the belt reel with one end section having an end. The end section extends through the slot, around the rod and finally through the slot out of the interior cavity. The end of the end section is provided with a thickened part having a width which, as measured in a direction transverse to the longitudinal axis, is larger than the minimum width of the slot.

6 Claims, 4 Drawing Sheets

BELT RETRACTOR

TECHNICAL FIELD

The invention relates to a belt retractor for a vehicle safety belt.

BACKGROUND OF THE INVENTION

Conventional belt retractors comprise a belt reel rotatably mounted in a frame, such belt reel being provided with a coaxial interior cavity, a rod arranged coaxially in the interior cavity with radial play, and a slot extending in parallelism to the longitudinal axis of the belt reel in a peripheral surface thereof, and an end section of the belt webbing threaded through the slot.

The rod arranged inside the belt reel in the case of such a belt retractor is a torsion rod, having the purpose of smoothing out load surges in the belt webbing system by elastic and/or plastic deformation. In a plane which is parallel to the longitudinal axis of the belt reel and is spaced from same, the slot for the attachment of the end section of the belt webbing extends from the peripheral surface and opens again at the peripheral surface, the end section of the belt webbing being attached to the belt retractor by providing the end, threaded through the slot and emerging again at the peripheral surface, of the end section with a thickened part, which is wider than the minimum width of the slot. However, the provision of the interior cavity of the belt reel for the accommodation of the rod does entail an impairment of the strength of the reel, something having to be compensated for by massive dimensions so that even heavy loads on the belt reel, occurring for example when it is blocked against rotation and when the belt webbing is substantially or completely unreeled from the belt reel, can be withstood with the required degree of safety.

BRIEF SUMMARY OF THE INVENTION

The present invention provides a belt retractor in which the load on the belt reel is reduced even in the case of the belt webbing being paid off from the reel to a very great extent and when subjected to heavy loads.

According to the invention, a belt retractor comprises a frame and a belt reel provided with a longitudinal axis and a peripheral surface. The belt reel is rotatably mounted in the frame and is provided with an interior cavity which is coaxial with the longitudinal axis. The belt reel is further provided with a slot having a minimum width and extending in parallelism to the longitudinal axis. The slot is open towards the peripheral surface of the belt reel and towards the interior cavity. The belt reel further comprises a rod extending coaxially through the interior cavity with a radial play. The belt retractor further comprises a belt webbing connected to the belt reel with one end section having an end. The end section extends through the slot, around the rod and finally through the slot out of the interior cavity. The end of the end section is provided with a thickened part having a width which, as measured in a direction transverse to the longitudinal axis, is larger than the minimum width of the slot. Simply owing to the fact that the slot does not open at the peripheral surface but rather inside the interior cavity means that there is an increase in the strength of the belt reel. A further advantageous feature is that a substantial part of the loads transmitted by the belt webbing is directly transferred to the rod and not to the belt reel.

In accordance with a preferred embodiment, a locking disk is provided at each axial end of the belt reel. The locking disks are coaxial with the longitudinal axis of the belt reel and are provided with a ratchet toothing each. These ratchet toothings are formed at an outer periphery of the locking disks. The torsion rod is connected to the locking disks so that any load applied to the torsion rod by means of the belt webbing is transferred at least to a substantial extent directly from the rod into the locking disks. In this embodiment, the loads transmitted by the belt webbing to the belt retractor are directly transferred from the locking disks to the frame, at which the locking disks abut in the event of there being a particularly high load.

Further possible developments of a belt retractor of the invention are defined in the dependent claims.

BRIEF DESCRIPTION OF THE DRAWINGS

The invention will now be explained with reference to a preferred embodiment thereof as illustrated in the drawings.

DETAILED DESCRIPTION OF THE INVENTION

Figure 1:
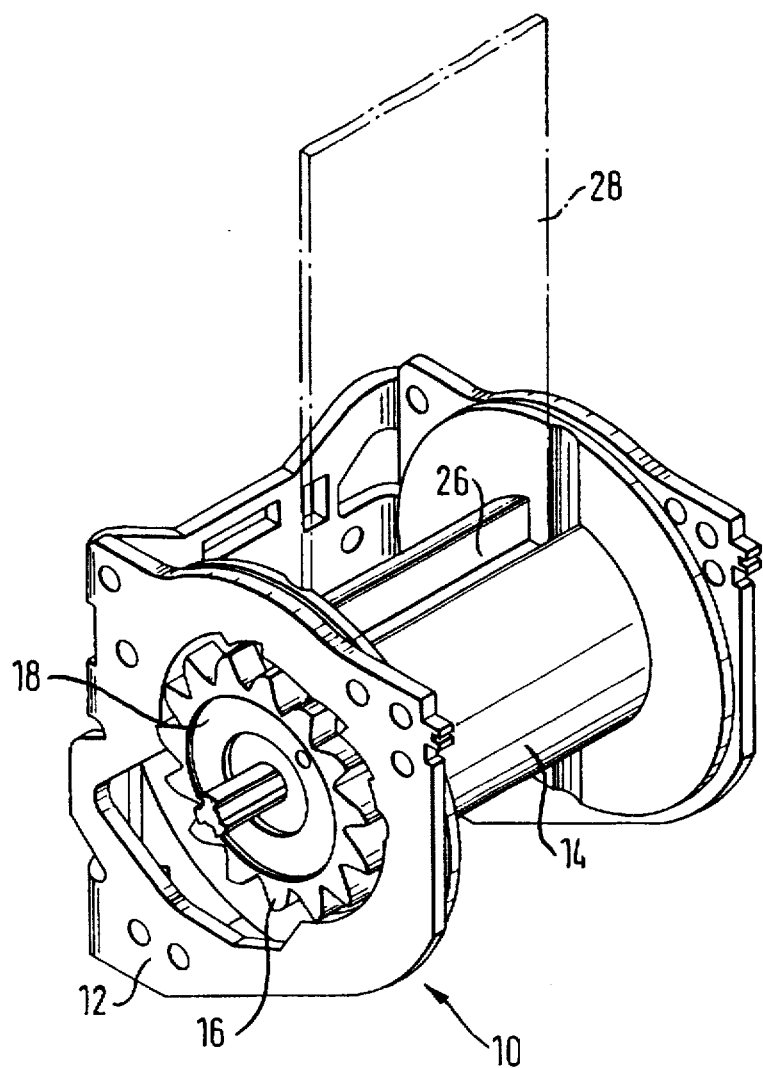
FIG. 1 is a perspective, diagrammatic elevation of a preferred embodiment of a belt retractor in accordance with the invention.
Figure 2:
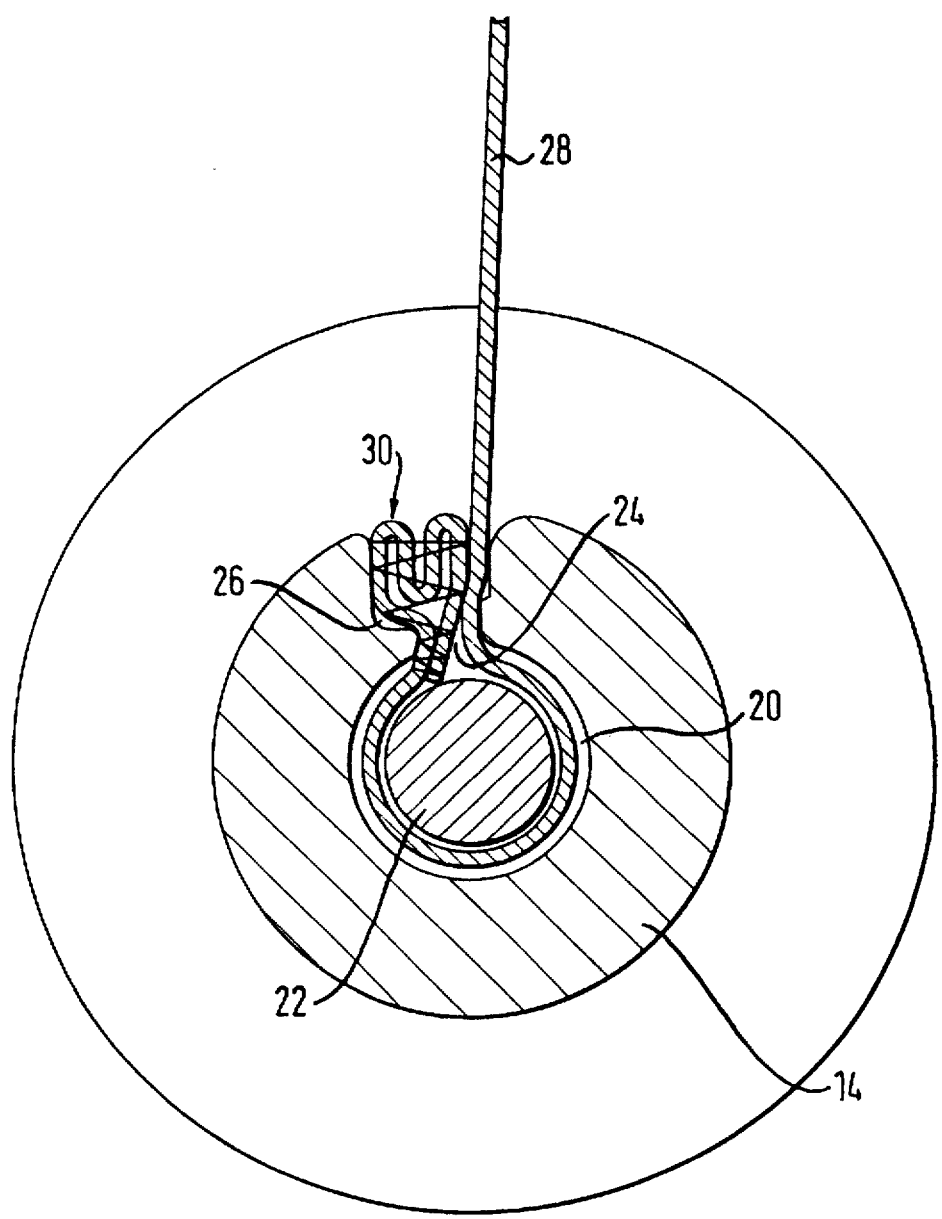
FIG. 2 shows a diagrammatic cross section taken through the belt reel of the belt retractor of FIG. 1.
Figure 3:
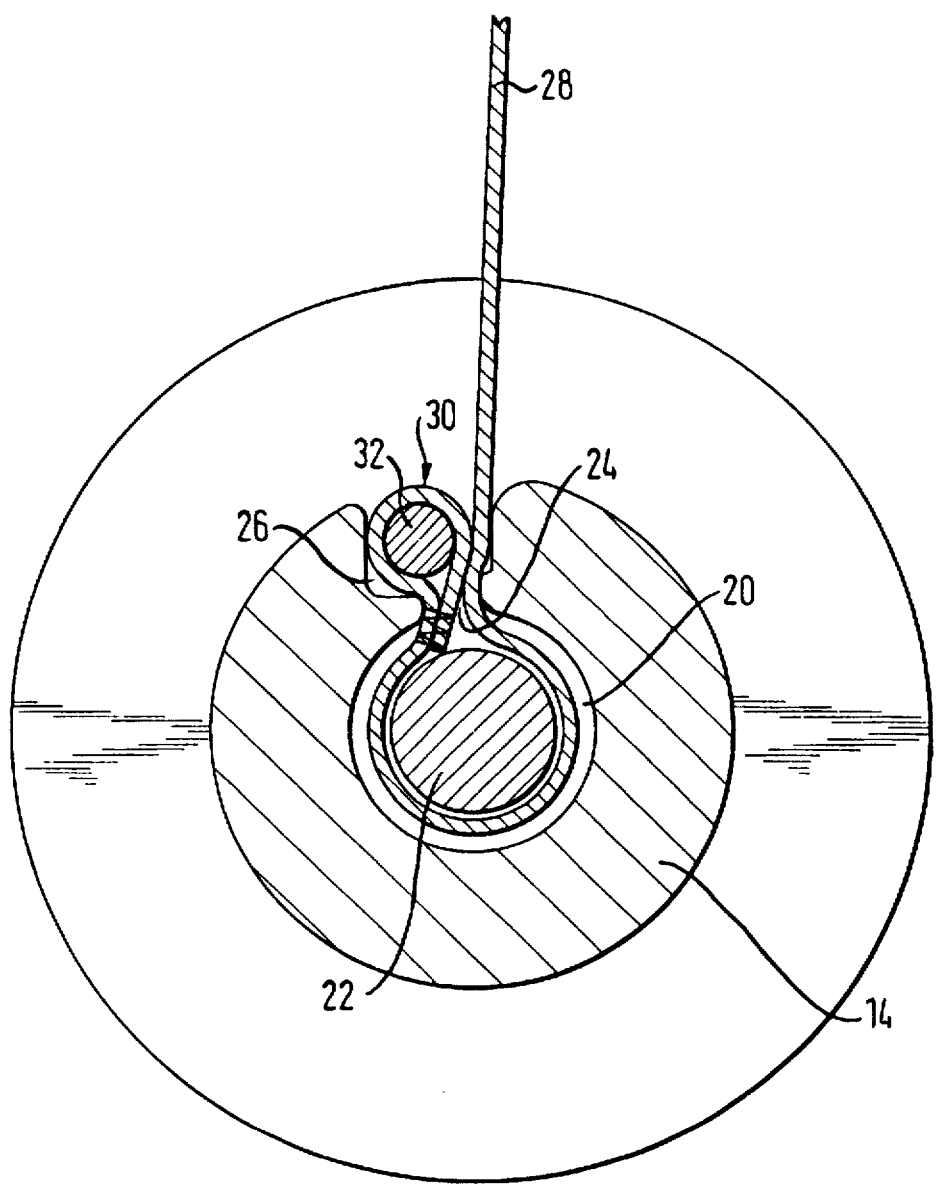
FIG. 3 is a diagrammatic cross section taken through the belt reel of the belt retractor of FIG. 1 embodying a further possible design thereof.
Figure 4:
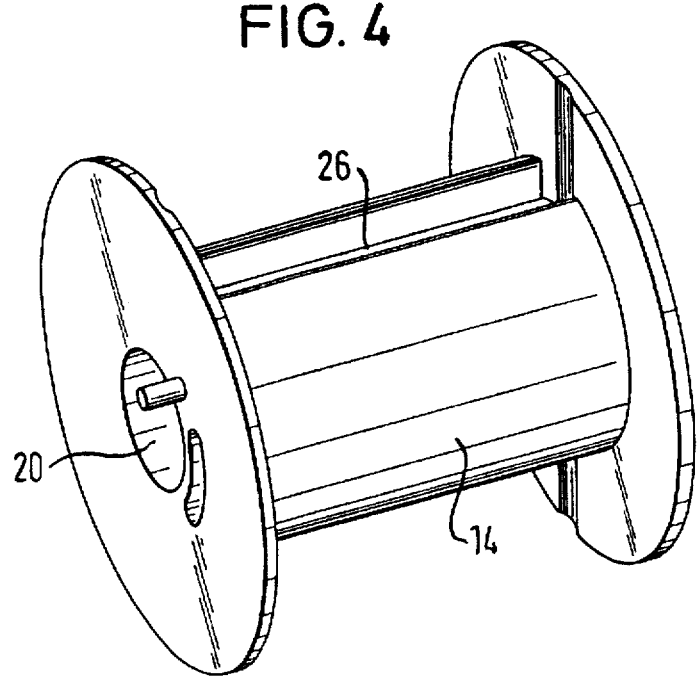
FIG. 4 is a perspective elevation of the belt reel of the belt retractor according to FIG. 1.

The FIGS. 1 through 5 diagrammatically show a preferred embodiment of a belt retractor 10 in accordance with the invention, the representation being such that functional parts which are not essential for gaining an understanding of the invention are omitted in order to render the drawing more straightforward. The belt reel 10 possesses a frame 12, in which a belt reel 14 is rotatably mounted by means of bearings (not illustrated). The belt reel 14 comprises a ratchet toothing 16 at each axial end, said ratchet toothings being formed at the outer periphery of locking disks 18 coaxial to the belt reel. The belt reel 14 comprises a coaxial interior cavity 20, in which a rod 22 is coaxially arranged. Between the interior cavity 20 and the peripheral surface of the belt reel 14 there extends an axis-parallel slot 24, which at its outer end is provided with a widened portion 26. The belt webbing able to be wound up on the belt retractor 10 has an end section 28 secured to the belt reel 14. For this purpose the end of the end section 28 is threaded through the slot 24 into the interior cavity 20 in the belt reel, then around the rod 22 and finally through the slot 24 back out of the interior cavity. The end of the end section 28 is provided with a thickened part 30 whose width as measured in the peripheral direction of the belt reel 14 is larger than the minimum width of the slot 24 and which is taken up by the widened portion 26. In the case of the embodiment of the invention depicted in FIG. 2, the thickened part is formed by several superimposed plies of the belt webbing, which are sewn together, whereas in the case of the alternative embodiment of FIG. 3 the thickened part is constituted by a holding part 32, which is sewn-in into a loop at the end of the belt webbing.

Figure 5:
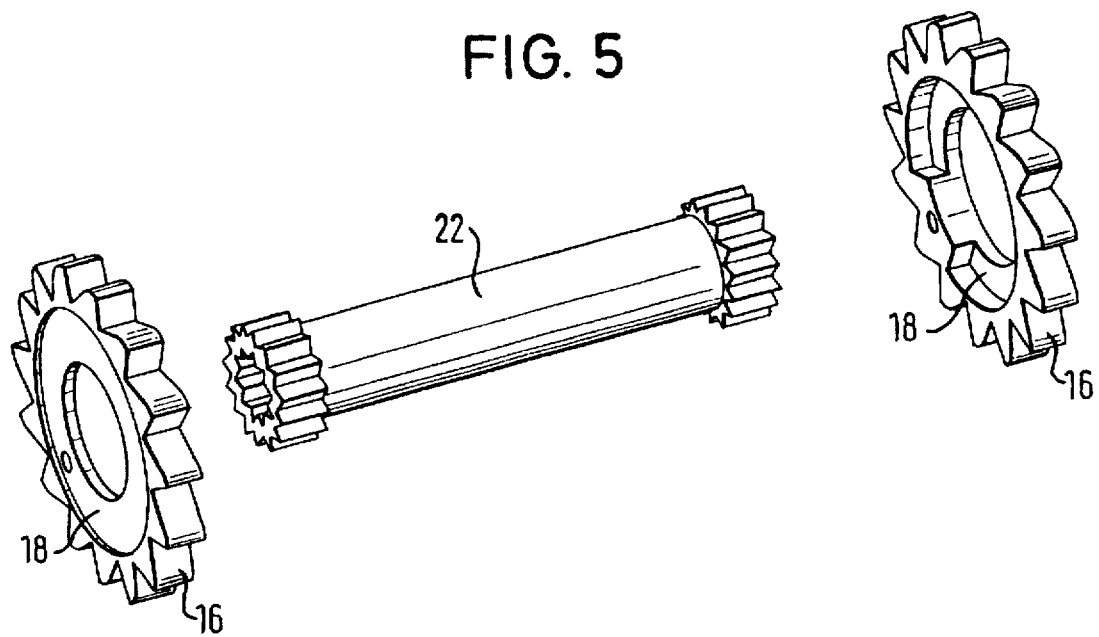
FIG. 5 is a perspective view of a rod and two locking disks as utilized in the belt retractor of FIG. 1.

The rod 22 is a torsion rod, whose end, which is to the left in terms of FIG. 5, is secured non-rotatably to the associated locking disk 18 and whose other end is connected non-rotatably to the belt reel 14. This torsion rod serves to smooth out any surges in load by elastic and/or plastic deformation. Owing to friction caused by the belt webbing being trained around the torsion rod 22, only a small fraction of the loads transmitted by the belt webbing is applied to the thickened part 30.

The design of the belt retractor of the invention entails the following advantages: Since the end 28 of the belt webbing, which is provided with the thickened part 30, lies on the outer side of the belt reel 14, the belt webbing may be mounted on the belt retractor 10 after same has been completely assembled. For this purpose the end section 28 is thrust through the slot 24 into the interior cavity 20 in the belt reel, then in the interior cavity 20 around the rod 22 and back through the slot 24 out of the belt reel 14 until the end of the end section 28 comes out of the slot 24 again. Then the thickened part 30 is formed. A significant advantage of the invention is produced when, with the belt webbing completely paid off from the belt reel 14, the webbing transmits extremely high loads to the belt retractor 10. Since the end section 28 of the belt webbing is completely wrapped around the rod 22, practically the entire load transferred by the belt webbing is taken up by the rod 22. The load transmitted to the belt reel 14 via the thickened part is comparatively small. At the axial ends of the belt reel 14, the applied load is transmitted by the rod 22 to the locking disks 18 and by same directly to the frame of the belt retractor 10 against which the ratchet toothings 16 bear when there is an extremely high load on the belt reel 14. Accordingly there is a particularly low load on the belt reel 14 and, although the belt reel 14 is, owing to the separately formed ratchet toothings 16, less strong than belt reels 14 with integrally formed ratchet toothings, there is a generally greater load carrying capacity of the belt retractor of the invention.

We claim:

1. A belt retractor comprising a frame, a belt reel provided with a longitudinal axis and a peripheral surface, said belt reel being rotatably mounted in said frame and being provided with an interior cavity which is coaxial with said longitudinal axis, and with a slot having a minimum width and extending in parallelism to said longitudinal axis, said slot being open towards said peripheral surface of said belt reel and towards said interior cavity, and further comprising a rod extending coaxially through said interior cavity with a radial play, and a belt webbing connected to said belt reel with one end section having an end, said end section extending through said slot, around said rod and finally through said slot out of said interior cavity, said end of said end section being provided with a thickened part having a width which, as measured in a direction transverse to said longitudinal axis, is larger than said minimum width of said slot.

2. The belt retractor of claim 1, wherein said thickened part is formed by several plies of said belt webbing, which are sewn together in a superimposed state.

3. The belt retractor of claim 1, wherein said thickened part is formed by a holding part sewn into said end.

4. The belt retractor of claim 1, wherein said slot is provided with a widened portion at said peripheral surface, said widened portion receiving said thickened part.

5. The belt retractor of claim 1, wherein said rod is a torsion rod.

6. The belt retractor of claim 5, wherein a locking disk is provided at each axial end of said belt reel, said locking disks being coaxial with said longitudinal axis of said belt reel and being provided with a ratchet toothing each, which is formed at an outer periphery of said locking disks, said torsion rod being connected to said locking disks so that any load applied to said torsion rod by means of said belt webbing is transferred at least to a substantial extent directly from said rod into said locking disks.

* * * * *

UNITED STATES PATENT AND TRADEMARK OFFICE
CERTIFICATE OF CORRECTION

PATENT NO. : 5,722,611  
DATED : March 3, 1998  
INVENTOR(S) : Johannes Schmid et al.

Page 1 of 1

It is certified that error appears in the above-identified patent and that said Letters Patent is hereby corrected as shown below:

<u>Title page,</u>
Item [73], Assignee, replace "TRW Occupant Restraint Systems GmbH; TRW Inc."
-- TRW Occupant Restraint Systems GmbH; Alfdorf, Federal Republic of Germany --.

Signed and Sealed this

Fifth Day of February, 2002

*Attest:*

*Attesting Officer*

JAMES E. ROGAN
*Director of the United States Patent and Trademark Office*